(12) United States Patent
Rowitch et al.

(10) Patent No.: US 7,859,453 B2
(45) Date of Patent: Dec. 28, 2010

(54) MULTIPLE RADIO DEVICE HAVING ADAPTABLE MODE NAVIGATION RADIO

(75) Inventors: Douglas N. Rowitch, Del Mar, CA (US); Emilija M. Simic, La Jolla, CA (US); Timothy P. Pals, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 12/165,514

(22) Filed: Jun. 30, 2008

(65) Prior Publication Data
US 2009/0322596 A1    Dec. 31, 2009

(51) Int. Cl.
*G01S 1/00*    (2006.01)
*G01S 5/00*    (2006.01)
(52) U.S. Cl. .............. 342/357.01; 342/357.29; 342/357.72
(58) Field of Classification Search ........... 342/357.01, 342/357.29, 357.72
See application file for complete search history.

(56) References Cited

U.S. PATENT DOCUMENTS

| | | | |
|---|---|---|---|
| 5,678,169 | A | 10/1997 | Turney |
| 6,107,960 | A | 8/2000 | Krasner |
| 7,525,481 | B2 | 4/2009 | Leinonen et al. |
| 2005/0242971 | A1* | 11/2005 | Dryer ............... 340/870.11 |
| 2009/0063174 | A1* | 3/2009 | Fricke ..................... 705/1 |

FOREIGN PATENT DOCUMENTS

EP    1783512 A1    5/2007

OTHER PUBLICATIONS

International Search Report and Written Opinion—PCT/US2009/048596—International Search Authority, EPO—Oct. 7, 2009.

* cited by examiner

*Primary Examiner*—Thomas H Tarcza
*Assistant Examiner*—Harry Liu
(74) *Attorney, Agent, or Firm*—Andrea L. Mays; Arnold J. Gum

(57) ABSTRACT

Methods and Apparatuses are provided for selectively specifying a mode of operation of a navigation radio within a device based, at least in part, on at least one operative condition associated with at least one other radio within the device.

52 Claims, 5 Drawing Sheets

(12) United States Patent

MULTIPLE RADIO DEVICE HAVING ADAPTABLE MODE NAVIGATION RADIO

BACKGROUND

1. Field

The subject matter disclosed herein relates to electronic devices and, and more particularly to methods and apparatuses for use in devices having a plurality of radios including an adaptable mode navigation radio.

2. Information

Wireless communication systems are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity among a plethora of devices, both fixed and portable. Many of these wireless systems are coupled together through other communication systems and resources to promote even more communication and sharing of information. Indeed, it is not uncommon for some devices to be adapted to communicate with more than one wireless communication system and this trend appears to be growing.

Another popular and increasingly important wireless technology includes navigation systems and in particular satellite positioning systems (SPS) such as, for example, the global positioning system (GPS) and other like Global Navigation Satellite Systems (GNSS). SPS radios, for example, may receive wireless SPS signals that are transmitted by a plurality of orbiting satellites of a GNSS. The SPS signals may, for example, be processed to determine a global time, an approximate or accurate geographical location, altitude, and/or speed associated with a device having the SPS radio.

SUMMARY

Methods and apparatuses are provided for selectively specifying a mode of operation of a navigation radio within a device based, at least in part, on at least one operative condition associated with at least one other radio within the device.

By way of example, one example apparatus may include at least one wireless system interface, at least one satellite positioning system (SPS) receiver, and at least one controller coupled to the wireless system interface and the SPS receiver. Here, the SPS receiver may be adapted to selectively operate in at least a first mode and a second mode, wherein the SPS receiver is adapted to receive a first SPS signal if operating in the first mode and a second SPS signal if operating in the second mode. The controller may be adapted to specify that the SPS receiver operate in at least one of the first, second (or other) modes based, at least in part, on at least one operative condition associated with the wireless system interface.

In certain exemplary implementations, an operative condition may, for example, be associated with a frequency related operative condition, a timing related operative condition, a transmission related operative condition, a reception related operative condition, and/or the like.

In certain exemplary implementations, a controller may, for example, be adapted to selectively initiate a change in the operation of the SPS receiver from the first mode to the second mode if the at least one operative condition associated with the wireless system interface is determined by the at least one controller to be: (i) operatively less compatible with the first mode and/or (ii) operatively more compatible with the second mode.

In certain exemplary implementations, a wireless system interface may be adapted for in a wireless communication system(s), wireless broadcast system(s), and/or the like.

In certain exemplary implementations, the first and/or second SPS signals may, for example, is associated with at least one Global Navigation Satellite System (GNSS), regional navigation system, Satellite Based Augmentation System (SBAS), and/or the like.

An exemplary method may, for example, include providing a communication device having at least one wireless system interface and at least one SPS receiver, wherein the SPS receiver is adapted to selectively operate in at least a first mode to receive a first SPS signal and in a second mode to receive a second SPS signal, and selectively specifying that the SPS receiver operate in one of the first mode or second modes based, at least in part, on at least one operative condition associated with the wireless system interface.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
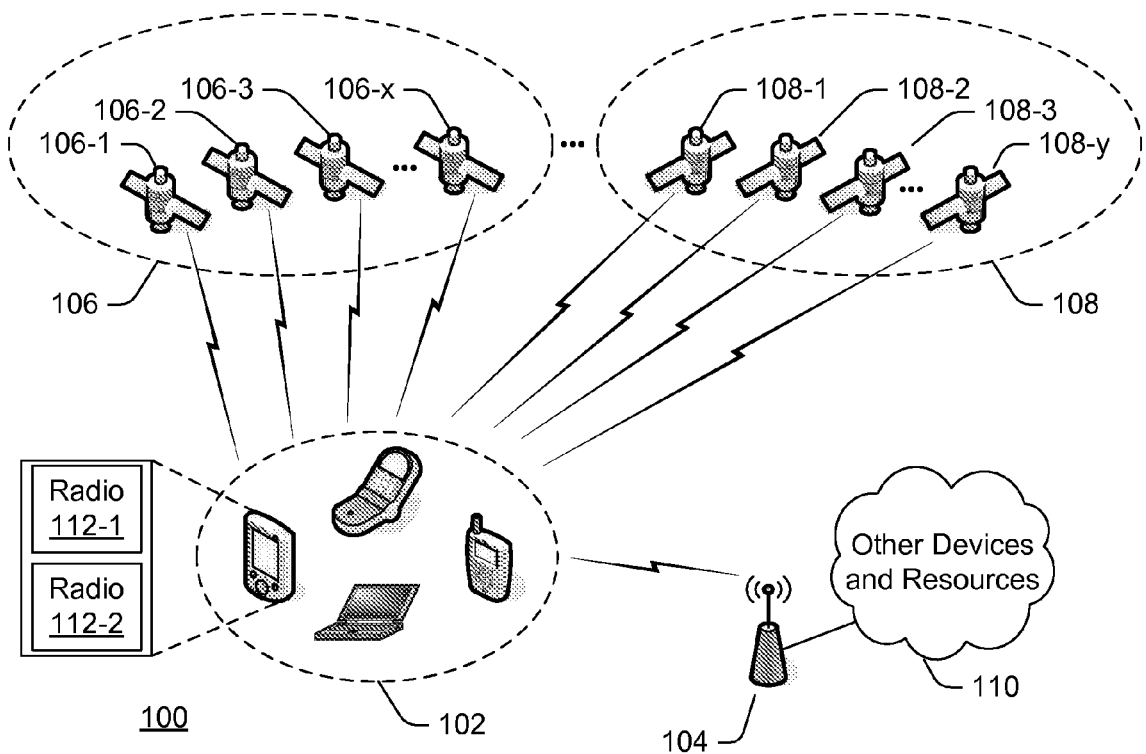
FIG. 1 is block diagram illustrating an exemplary environment that includes a device having a plurality of radios including an adaptable mode navigation radio.

FIG. 1 is a block diagram illustrating a wireless environment 100 that may include various computing and communication resources adapted to provide concurrent wireless communication and navigation services in accordance with certain exemplary implementations of present description.

Wireless environment 100 may be representative of any system(s) or a portion thereof that may include at least one device 102 adapted to transmit and/or receive wireless signals to/from at least one wireless system 104. Device 102 may, for example, include a mobile device or a device that while movable is primarily intended to remain stationary. Thus, as used herein, the terms "device" and "mobile device" may be used interchangeable as each term is intended to refer to any single device or any combinable group of devices that may transmit and/or receive wireless signals. The terms "receive" and "acquire" are used interchangeably herein and are both intended to represent the reception of a wireless signal such that information that is carried via the wireless signal is acquired by the receiver.

With this in mind and by way of example but not limitation, as illustrated using icons in FIG. 1, device 102 may include a mobile device such as a cellular phone, a smart phone, a personal digital assistant, a portable computing device, and/or the like or any combination thereof. In other exemplary implementations, device 102 may take the form of a machine that is mobile or stationary. In still other exemplary implementations, device 102 may take the form of one or more integrated circuits, circuit boards, and/or the like that may be operatively adapted for use in another device.

Regardless of the form of device 102, device 102 may include at least two radios 112-1 and 112-2 wherein each of the radios may be adapted to concurrently operate in some manner. The term "radio" as used herein refers to any circuitry and/or the like that may be adapted to receive wireless signals and/or transmit wireless signals. In certain implementations, two or more radios may be adapted to share a portion of circuitry and/or the like (e.g., a processing unit, memory, antenna, etc.).

By way of example but not limitation, in some of the examples presented herein device 102 may include a first radio that is adapted to receive wireless signals associated with at least one navigation system 106 (e.g., a satellite positioning system, and/or the like), and a second radio that is adapted to receive and transmit wireless signals associated with at least one wireless system 104. Wireless system 104 may include, for example, a wireless communication system, such as, e.g., a wireless telephone system, a wireless local area network, and/or the like. Wireless system 104 may include, for example, a wireless broadcast system, such as, e.g., a television broadcast system, a radio broadcast system, and/or the like. In certain implementations, device 102 may be adapted only to receive wireless signals from wireless system 104, while in other implementations mobile station 102 may be adapted only to transmit wireless signals to wireless system.

As illustrated in FIG. 1, wireless system 104 may be adapted to communicate with and/or otherwise operatively access other devices and/or resources as represented simply by cloud 110. For example, cloud 110 may include one or more communication devices, systems, networks, or services, and/or one or more computing devices, systems, networks, or services, and/or the like or any combination thereof.

Wireless system 104 may, for example, be representative of any wireless communication system or network that may be adapted to receive and/or transmit wireless signals. By way of example but not limitation, wireless system 104 may include a wireless wide area network (WWAN), a wireless local area network (WLAN), a wireless personal area network (WPAN), a wireless metropolitan area network (WMAN), a Bluetooth communication system, WiFi communication system, Global System for Mobile communications (GSM) system, Evolution Data Only/Evolution Data Optimized (EVDO) communication system, Ultra Mobile Broadband (UMB) communication system, Long Term Evolution (LTE) communication system, Mobile Satellite Service-Ancillary Terrestrial Component (MSS-ATC) communication system, and/or the like.

The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Such location determination techniques described herein may also be used for any combination of WWAN, WLAN, WPAN, WMAN, and/or the like.

Wireless system 104 may, for example, be representative of any wireless broadcast system that may be adapted to at least receive wireless signals. By way of example but not limitation, a wireless broadcast system may include a MediaFLO system, a Digital TV system, a Digital Radio system, a Digital Video Broadcasting-Handheld (DVB-H) system, a Digital Multimedia Broadcasting (DMB) system, an Integrated Services Digital Broadcasting—Terrestrial (ISDB-T) system, and/or other like systems and/or related broadcast techniques.

Device 102 may be adapted to at least receive wireless signals from at least one navigation system 106 which is illustrated in FIG. 1 as a satellite positioning system (SPS) having a plurality of SPS signal transmitting satellites 106-1, 106-2, 106-3, . . . , 106-x. Those skilled in the art will recognize that navigation system 106 may include additional transmitting and/or other supporting resources in addition to or instead of the satellites as illustrated.

In certain implementations, navigation system 106 may be adapted to provide other non-navigation related services (e.g., communication services, or the like). As such, in certain implementations device 102 may be adapted to transmit wireless signals to navigation system 106.

Device 102 may also be adapted to at least receive wireless signals from at least one other navigation system 108, which is illustrated in FIG. 1 as an SPS having a plurality of SPS signal transmitting satellites 108-1, 108-2, 108-3, . . . 108-y.

The satellite vehicles (SVs) of navigation systems 106 and/or 108 may each be adapted to transmit a unique SPS signal of which, at least a portion, may be received by device 102 and used in some manner for navigation, for example, to determine a time, a range, a location, a position, etc. The specific navigation signaling and location determining techniques may vary depending on the navigation system(s) being used. Such SVs may be adapted to transmit one or more signals at the same or different carrier frequencies. For example, a GPS satellite may be adapted to transmit L1 C/A and L1C signals in the same band, as well as, the L2C and L5 signals at other carrier frequencies, etc. Furthermore, such SPS signals may include encrypted signals.

A SPS typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting SVs. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation. In accordance with certain aspects, the techniques presented herein are not restricted to global systems (e.g., GNSS) for SPS. For example, the techniques provided herein may be applied to or otherwise adapted for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise adapted for use with one or more global and/or regional navigation satellite systems. By way of example but not limitation, an SBAS may include an augmentation system(s) that provide integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Such SBAS may, for example, transmit SPS and/or SPS-like signals that may also be interfered with by certain wireless communication signals, etc. Thus, as used herein an SPS may include any combination of one or more global and/or regional navigation satellite systems and/or augmentation systems, and SPS signals may include SPS, SPS-like, and/or other signals associated with such one or more SPS.

To estimate its location, device 102 may determine pseudorange measurements to SVs that are "in view" of its receiving radio using well known techniques based, at least in part, on detections of PN codes in signals received from the SVs. Such a pseudorange to a SV may be determined based, at least in part, on a code phase detected in a received signal marked with a PN code associated with the SV during a process of acquiring the received signal at the receiving radio. To acquire the received signal, device 102 may, for example, be adapted to correlate the received signal with a locally generated PN code associated with a SV. For example, device 102 may correlate such a received signal with multiple code and/or time shifted versions of such a locally generated PN code. Detection of a particular time and/or code shifted version yielding a correlation result with the highest signal power may indicate a code phase associated with the acquired signal for use in measuring pseudorange as discussed above.

Thus, in certain implementations, device 102 may be adapted to determine its location in such a manner or other like manner without additional support from other devices. In other implementations, however, device 102 may be adapted to operate in some manner with one or more other devices to determine its location and/or to support other navigation related operations. Such navigation techniques are well known.

In certain implementations, device 102 may be adapted to receive SPS signals from one or more GNSS, such as, for example, GPS, Galileo, GLONASS, Compass, or other like system that uses a combination of these systems, or any SPS developed in the future, each referred to generally herein as a SPS. As used herein, an SPS will also be understood to include pseudolite systems.

Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites may be useful in situations where signals from an orbiting SV might be unavailable, such as in tunnels, mines, buildings, urban canyons or other enclosed areas. Another implementation of pseudolites is known as radio-beacons. The terms "satellite" and "SV", as used herein, are interchangeable and intended to include pseudolites, equivalents of pseudolites, and possibly others. The term "SPS signals", as used herein, is intended to include SPS-like signals from pseudolites or equivalents of pseudolites.

Radios 112-1 and 112-2 of device 102 may be adapted to concurrently operate in accordance with certain aspects of the present description. As illustrated in examples that follow, in certain implementations the transmitted wireless signals and/or circuitry associated with one or more of radios 112-1 and 112-2 may interfere or otherwise affect the other one or more of radios and/or circuitry associated therewith in device 102. In certain implementations, it may be desirable to avoid or reduce such interference or other potentially detrimental effects as such may reduce the operational performance of device 102.

An example of such potential interference may be illustrated by having radio 112-1 be adapted to receive SPS signals and radio 112-2 being adapted to at transmit and/or receive wireless signals associated with wireless system 104. The SPS signals transmitted by SVs may be substantially weak when received by radio 112-1 and consequently more susceptible to interference by other signals and/or unintentional electromagnetic noise sources, and in particular signals that are of greater strength as might be the wireless signals transmitted between radio 112-2 and wireless system 104.

The concurrent use of radios 112-1 and 112-2 may interfere with SPS signal reception by radio 112-1, under certain conditions, even though each of the signals may be transmitted at different frequencies and/or in different frequency bands and/or channels. Thus, for example, in certain implementations wireless signals transmitted between radio 112-2 and wireless system 104 may be of significant strength that a portion or component of the transmitted signal may interfere with SPS signal reception by radio 112-1. For example, in accordance with an aspect of the present description, it is believed that one or more harmonic components (e.g., a second harmonic) of a wireless communication signal that is transmitted at about 700 MHz may, under certain conditions, interfere with SPS signal reception for SPS signals transmitted at about 1575 MHz (e.g., GPS L1 band GNSS signals).

In accordance with other aspects of the present description, it is believed that one or more harmonic components of wireless communication signals that at various other frequencies may, under certain conditions, interfere with SPS signal reception for SPS signals. By way of further example, MSS-ATC L-band communications may interfere with certain SPS signals. For example, current proposals have been made to license spectrum for wideband terrestrial (cellular) communications in the L1 frequency band in proximity to certain existing GNSS signals (e.g., downlink signaling may occur at 1526-1536 MHz and 1545-1555 MHz and Uplink signaling may occur at 1627-1638 MHz and 1646-1657 MHz). In another example, even with stringent specifications on out-of-band emissions, there may be a potential for interference with to certain L1 band GNSS signals due to intermodulation between 802.11b/g and cellular band CDMA. Here, for example, such transmit intermodulation between 802.11b/g at 2.4 GHz and cellular band CDMA at 800 MHz may yield spectra that interferes with L1 band GNSS signals. In still another example, wireless communications at or near 450 MHz band communications may interfere with L1 band GNSS signals, for example, via a fourth harmonic of a transmit envelope. These are but a few examples of signals that may interfere (e.g., promote broadband desense) with certain GNSS signals.

Other types of interference may also occur with regard to SPS signal reception. For example, GNSS local oscillator (LO) spurs (e.g., spurs from the GNSS LO itself or leakage of other digital signals onto the GNSS LO) or the like may lead to interference by mixing with a transmission (uplink) signal in a manner that may generate a GNSS in-band jammer. Such spurs may, for example, be present in a particular GNSS band and not in another.

As described in greater detail in subsequent sections, device 102 may allow concurrent operation of radios 112-1 and 112-2 according to the exemplary methods and apparatuses provided herein. For example, in certain implementations device 102 (see e.g., FIG. 3) may include at least one wireless system interface 306 and at least one satellite positioning system (SPS) receiver (304) adapted to selectively operate in at least a first mode and a second mode. Here, for example, SPS receiver 304 may be adapted to acquire a first SPS signal 332 if operating in the first mode and acquire a second SPS signal 334 if operating in the second mode. In certain implementations the first and second SPS signals may be associated with one GNSS or with different GNSS(s). Device 102 may also include at least one controller 302 that may be adapted to specify that SPS receiver 304 operate in either the first mode or the second mode (or possibly some other mode) based, at least in part, on at least one operative condition associated with wireless system interface 306. Thus, for example, device 102 may selectively transition the SPS receiver receiving in one frequency, frequency band, or frequency channel to another frequency, frequency band, or frequency channel based at least in part on the operative condition associated with the wireless system interface 306. In another example, device 102 may selectively transition the SPS receiver acquiring SPS signals from one GNSS to acquiring SPS signals from at least one other GNSS based on the operative condition associated with the wireless system interface 306. As such, device 102 may be able to avoid or otherwise reduce deleterious SPS signal interference by actively adapting SPS receiver 304 based on at least one operative condition associated with the wireless system interface 306.

Figure 2:
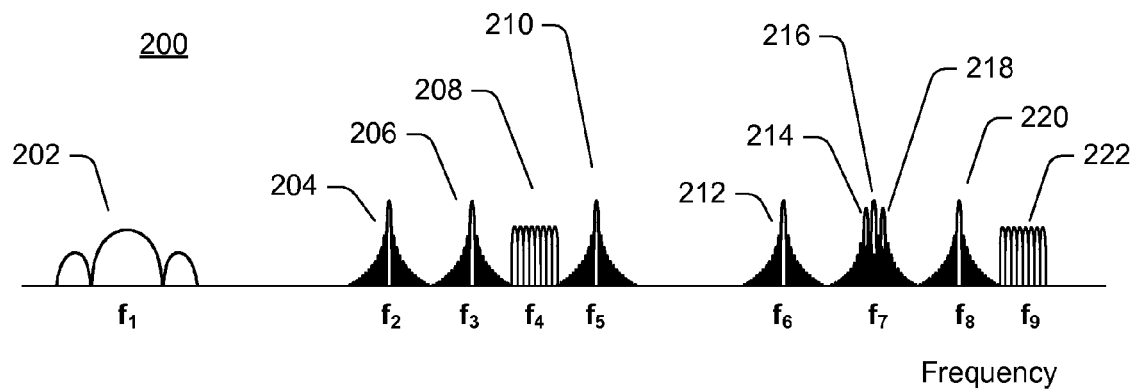
FIG. 2 is an illustrative graph showing some exemplary spectra associated with various satellite positioning system (SPS) signals that may, for example, be suitable for reception by the device in FIG. 1.

With this adaptive capability in mind, FIG. 2 is a graph 200 illustrating different spectra representative of a plurality of wireless signal transmissions associated with various exemplary GNSS. In the non-exhaustive examples shown in graph 200, various different types of spectra are illustrated as being centered or otherwise associated with a carrier or center frequency ($f_n$) that may be within a specified standard, frequency band and/or channel associated with a frequency band. Those skilled in the art will recognize that the spectra in FIG. 2 as well as the various frequencies are intended to be illustrative only and is not intended by shape, placement, and/size to represent actual waveforms, communication schemes or techniques, etc., and/or to otherwise limit in some manner the scope of the subject matter claimed herein.

Thus, with reference to graph 200 and by way of example but not limitation SPS signals 332 and/or 334, may include GNSS signals such as GPS L1 C/A and/or L1C band signals (represented by spectrum 216, wherein $f_7 \approx 1575.42$ MHz), GPS L2C band signals (represented by spectrum 206, wherein $f_3 \approx 1227.60$ MHz), GPS L5 band signals (represented by spectrum 202, wherein $f_1 \approx 1176.45$ MHz), Galileo L1F band signals (represented by spectrum 216, wherein $f_7 \approx 1575.42$ MHz), Galileo E5A band signals (represented by spectrum 202, wherein $f_1 \approx 1176.45$ MHz), Glonass L1 band signals (represented by spectrum 222, wherein $f_9 \approx 1601$ MHz), Glonass L2 band signals (represented by spectrum 208, wherein $f_4 \approx 1246$ MHz), Compass (Beidou) L1 band signals (represented by spectrum 212, wherein $f_6 \approx 1561$ MHz, and spectrum 220, wherein $f_8 \approx 1590$ MHz), Compass (Beidou) L2 band signals (represented by spectrum 204, wherein $f_2 \approx 1207$ MHz, and spectrum 210, wherein $f_5 \approx 1268$ MHz), and/or the like.

As illustrated in FIG. 2, the various SPS signals are distributed over a variety of frequencies and accordingly selectively switching the SPS receiver between such SPS signals may allow for device 102 to avoid or otherwise reduce interference that may affect reception and acquisition of SPS signals. By way of example but not limitation, interference associated with a wireless system may increase desense (e.g., elevated noise floor) in a GPS L1 band due to a second harmonic of a 700 MHz transmitted signal. According to an exemplary aspect, an a mode of an SPS receiver may be changed to avoid the GPS L1 band/signal and instead focus on the GPS L2C band/signal to reduce and/or avoid such interference.

In accordance with an aspect, the methods and apparatuses provided herein may be implemented to provide such selective/dynamic mode switching in a low current receiver. For example, instead of designing a receiver with high linearity to provide tolerance for potential jammers, etc., one may design a multimode receiver that may provide for a reduced level of jammer immunity and which instead employs mode switching to find one or more less problematic SPS signals. Such a receiver may, for example, be implemented on a reduced amount of die area in certain example implementations.

Figure 3:
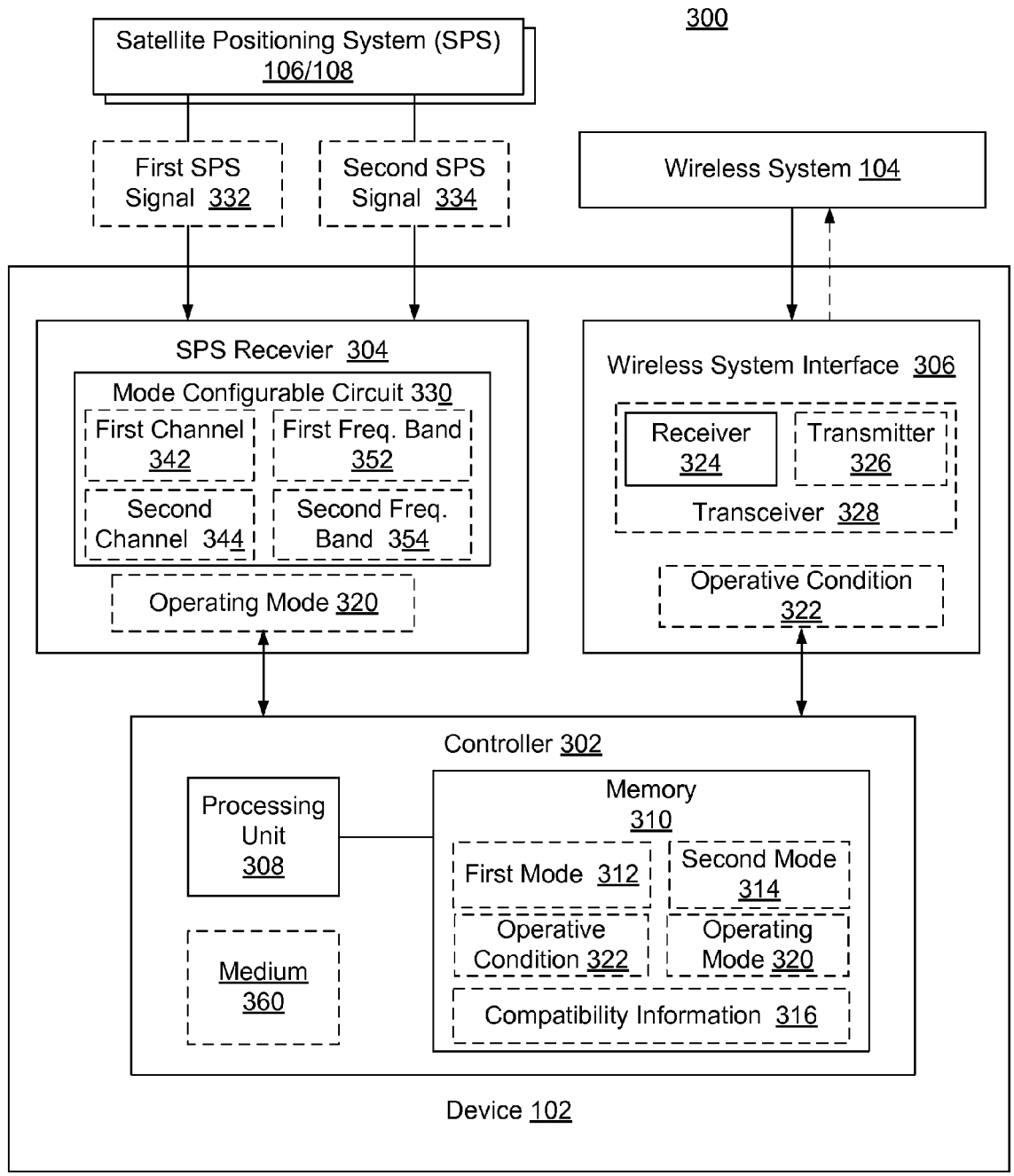
FIG. 3 is a block diagram illustrating certain features of an exemplary device that may, for example, be implemented in the environment of FIG. 1.

Reference is now made to FIG. 3, which is a block diagram is depicting an exemplary system 300 that may be adapted for use in environment 100. As shown, device 102 may include at least one SPS receiver 304 and at least one wireless system interface 306. SPS receiver 304 is selectively adaptable to acquire at least first SPS signal 332 and second SPS signal 334 as transmitted by SPS 106 and/or SPS 108. SPS receiver 304 may include at least one mode configurable circuit 330 that may be selectively adapted to selectively receive SPS signals based, at least in part, on an operating mode 320. Operating mode 320 may, for example, be specified (e.g., initiated, provided, selected, or otherwise established in some manner) by a controller 302 or other like circuitry. Operating mode 320 may be based, at least in part, on at least one operative condition 322 associated with wireless system interface 306.

As selectively adapted in accord with a first mode 312, SPS receiver 304 may, for example, be selectively adapted to receive first SPS signal 332 over a first channel 342 or a first frequency or frequency band 352. As selectively adapted in accord with a second mode 314, SPS receiver 304 may, for example, be selectively adapted to receive second SPS signal 334 over a second channel 344 or a second frequency or frequency band 354.

Controller 302 may, for example, include at least one processing unit 308 or other like control logic or circuitry that is operatively coupled to memory 310. As shown in this example, memory 310 may include or otherwise be adapted to store and provide instructions and or information relating at least one of the first mode 312, second mode 314, compatibility information 316, operative condition 322, and/or the like. Memory 310 may, for example, include computer implementable instructions suitable for use by processing unit 308.

Such instructions and/or other information, or a portion thereof, may, for example, be provided to processing unit 308 and/or memory 310 by SPS receiver 304, wireless system interface 306, and/or a computer readable medium 360. For example, controller 302 and/or memory 310 may be programmed or otherwise adapted in some manner based on instructions or information provided through medium 360 during manufacture or at some later time. For example, controller 302 and/or memory 310 may be programmed or otherwise adapted in some manner for use with SPS receiver 304 based on instructions or information provided by or accessed from SPS receiver 304 during manufacture or at some later time. In certain implementations, for example, SPS receiver 304 may periodically, dynamically, and/or in some other manner identify a current operating mode 320 and/or available operating modes for mode configurable circuit 330.

In other exemplary implementations, controller 302 and/or memory 310 may be programmed or otherwise adapted in some manner for use with wireless system interface 306 based on instructions or information provided by or accessed from wireless system interface 306 during manufacture or at some later time. In certain implementations, for example, wireless system interface 306 may periodically, dynamically, and/or in some other manner identify at least one operative condition 322. Here, operative condition 322 may, for example, be associated with at least one receiver 324, at least one transmitter 326, and/or at least one transceiver 328 that may be included in wireless system interface 306.

By way of example but not limitation, operative condition 322 may be associated with a frequency related operative condition, a timing related operative condition, a transmission related operative condition, a reception related operative condition, and/or the like or any combination thereof. As an example, a frequency related operative condition may specify a frequency, frequency band, a channel in a frequency band, and/or other like or related frequency information regarding wireless system interface 306 and/or wireless system 104. Thus, in certain implementations, operative condition 322 may specify in some manner that wireless system interface 306 is adapted to receive and/or transmit wireless signals at 700 MHz, etc. Operative condition 322 may identify in some manner that wireless system interface 306 is of a particular type of radio and as such the frequency related operative condition may be known based on the type of radio.

A timing related operative condition may, for example, specify a time or time period or the like regarding the operation of wireless system interface 306 and/or wireless system 104. Thus, in certain implementations, operative condition 322 may specify in some manner that wireless system interface 306 is adapted to receive and/or transmit wireless signals at or during a specified time.

A transmission related operative condition may, for example, specify that wireless system interface 306 is adapted to transmit wireless signals, and/or include other information regarding the transmitting capability of transmitter 326 and/or transceiver 328, and/or similar transmission information associated with wireless system 104. Thus, in certain implementations, operative condition 322 may specify in some manner that wireless system interface 306 is adapted to transmit wireless signals.

A reception related operative condition may, for example, specify that wireless system interface 306 is adapted to receive wireless signals, and/or include other information regarding the receiving capability of receiver 324 and/or transceiver 328. Thus, for example, operative condition 322 may specify in some manner that wireless system interface 306 is adapted to receive wireless signals. Indeed, in certain implementations, operative condition 322 may specify that wireless system interface 306 is only adapted to receive wireless signals.

As illustrated in the examples herein, operative condition 322 may be adapted to specify various levels of information regarding wireless system interface 306. For example, operative condition 322 may simply identify that wireless system interface 306 is present or absent, is activated or not activated, is of one type or another, etc. As shown in FIG. 3, operative condition 322 may be provided by wireless system interface 306 or may be provided by memory 310. As such, in certain implementations operative condition 322 may be dynamically established, while in other implementations operative condition 322 may be programmably established.

Controller 302 may, for example, be adapted to selectively set, or otherwise initiate a change in, the operation of SPS receiver 304 by way of operating mode 320. As shown in the exemplary system of FIG. 3, operating mode 320 may, for example, be provided to SPS receiver 304 and/or memory 310.

Controller 302 may, for example, be adapted to selectively initiate a change in, operation of SPS receiver 304 between first mode 312 and second mode 314 based, at least in part, on compatibility information 316 that may be provided in memory 310. By way of example but not limitation, compatibility information 316 may specify in some manner that at least one operative condition 322 associated with said wireless system interface 304 may be operatively less or more compatible with either first mode 312 or second mode 314. For example, compatibility information may include data (e.g., look-up table, etc.) listing "compatible" and/or "incompatible" operational aspects associated with SPS receiver 304 and wireless system interface 306. For example, compatibility information may include instructions (e.g., rules, etc.) that may specify how processing unit 308 may determine certain "compatible" and/or "incompatible" operational aspects associated with SPS receiver 304 and wireless system interface 306.

As such, controller 302 may, for example, be adapted to determine whether it may be beneficial to transition SPS receiver 304 to operate in another operating mode based, at least in part, on operative condition 322 and compatibility information 316. In certain implementations, compatibility information 316 may, for example, be programmably established during manufacture and/or at some later time. In certain implementations, compatibility information 316 may, for example, be dynamically established (e.g., learned) during or after usage of device 102. For example, processing unit may be adapted to identify certain "compatible" and/or "incompatible" operational aspects associated with SPS receiver 304 and wireless system interface 306 by monitoring (or otherwise accessing information regarding) the operation of SPS receiver 304 while attempting to operate in different modes.

In certain example implementations, one or more SPS receivers may be adapted to operate in one or more modes. While such modes may, for example, include receiving specific SPS signals, such modes may include receiving a plurality of SPS signals. For example, an SPS receiver may be adapted to monitor a plurality of frequencies for one or more SPS signals simultaneously and select one or more of the plurality of frequencies and/or SPS signals depending on the operative conditions of one or more wireless systems.

Figure 4:
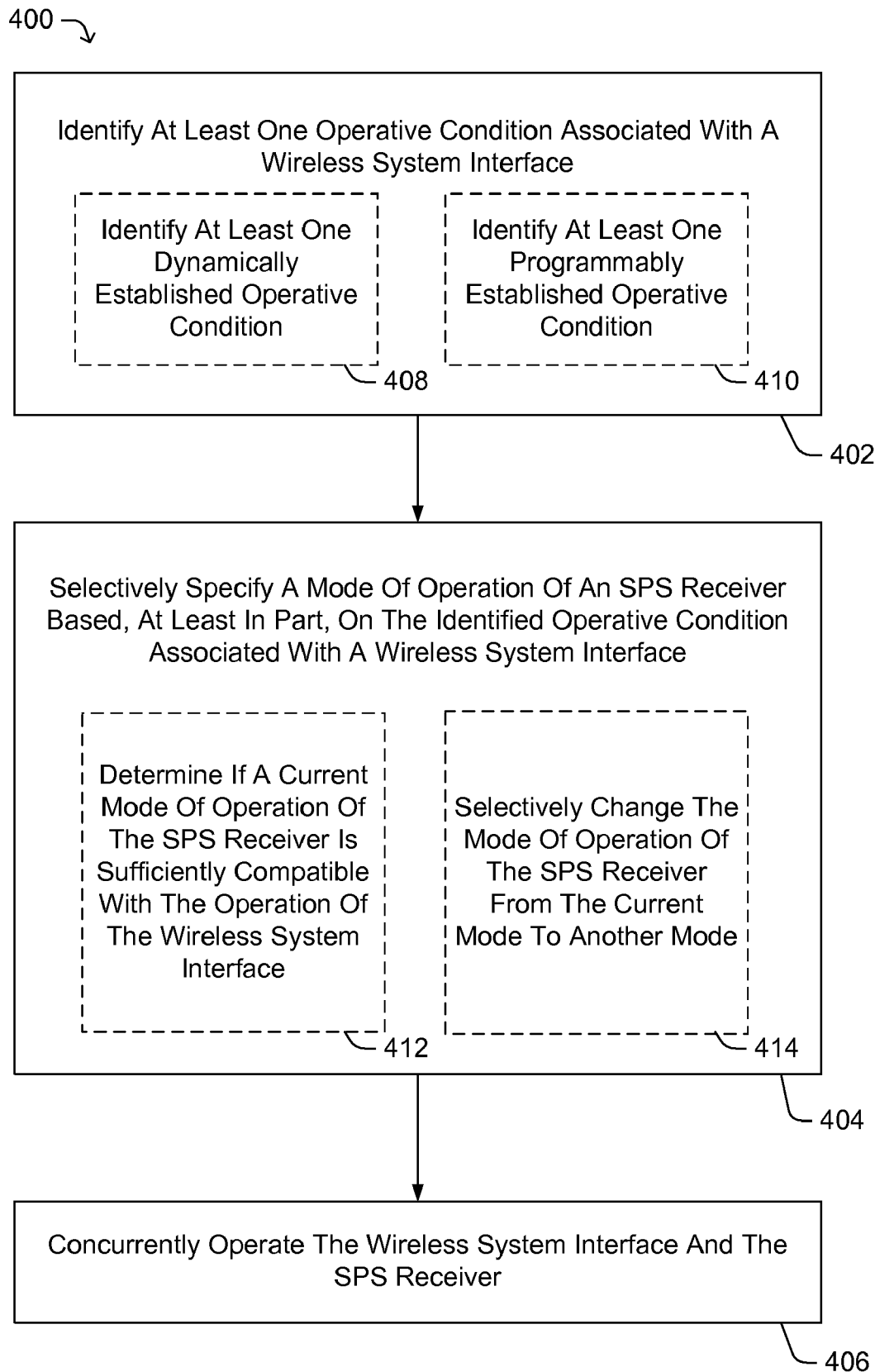
FIG. 4 is a flow diagram illustrating a method that may, for example, be implemented in the environment of FIG. 1.

Reference is now made to FIG. 4, which is a flow diagram illustrating an exemplary method 400 that may, for example, be implemented in device 102 and/or the like.

At block 402, at least one operative condition associated with a wireless system interface may be identified. Block 408 may, for example, include at block 408, indentifying at least one dynamically established operative condition, and/or at block 410, identifying at least one programmably established operative condition.

At block 404, a mode of operation of an SPS receiver may be selectively specified based, at least in part, on the operative condition identified at block 402 Block 404 may, for example, include at block 412 determining is a current mode of operation of the SPS receiver is sufficiently "compatible" with the operation of the wireless system interface. Block 404 may, for example, include at block 414, selectively changing a mode operation of the SPS receiver from a current mode to another mode.

At block 406, the wireless system interface and the SPS receiver may be concurrently operated in some manner. For example, in certain implementations, per block 406, the wireless system interface may be receiving while the SPS receiver is receiving. For example, in certain implementations, per block 406, the wireless system interface may be transmitting while the SPS receiver is receiving.

Figure 5:
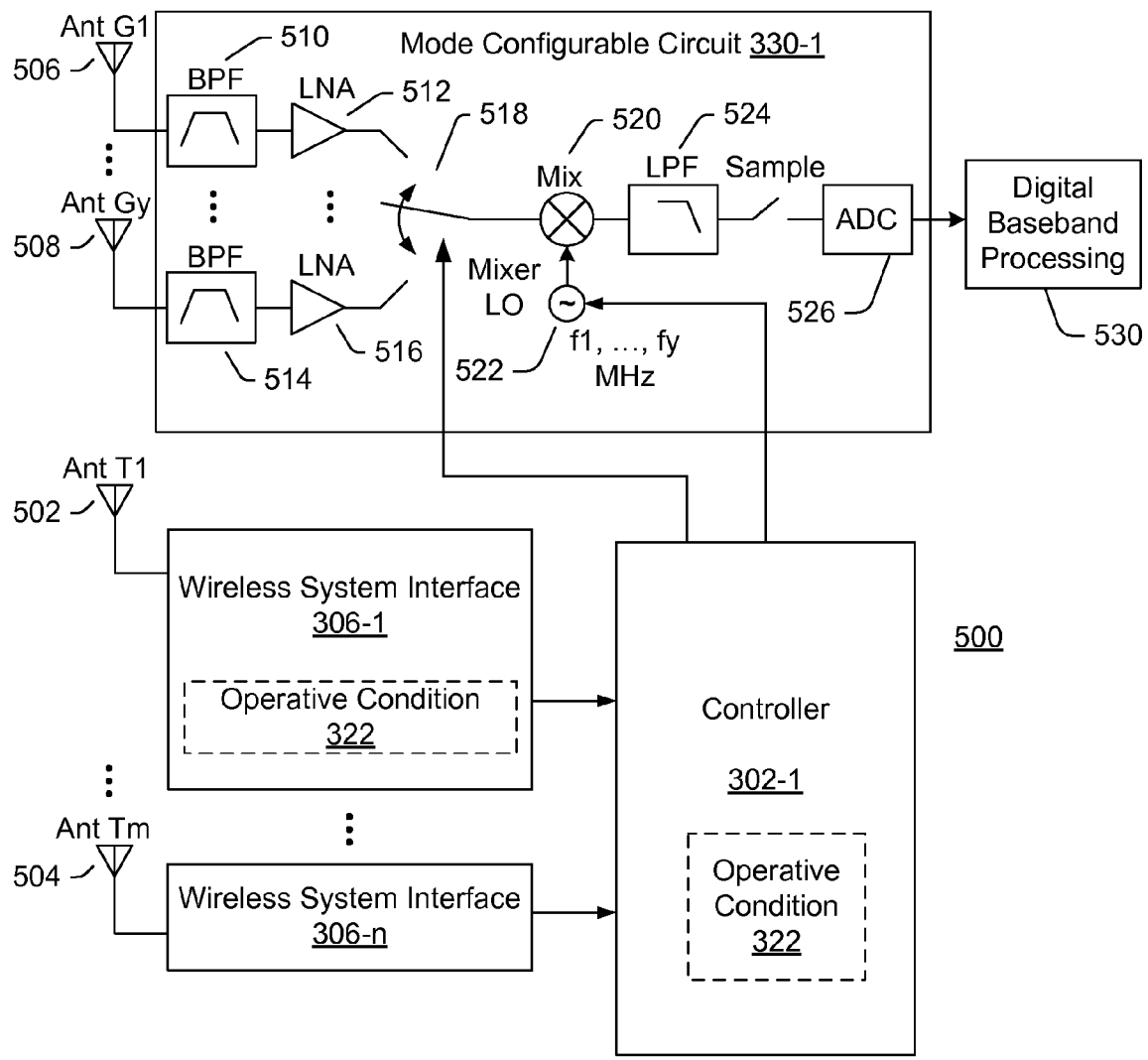
FIG. 5 is a block diagram illustrating certain features of an exemplary device having a single receive path mode configurable circuit that may, for example, be implemented in the device of FIG. 1.

FIG. 5 is a block diagram illustrating certain features of an exemplary device 500 having a single receive path mode configurable circuit 330-1. Mode configurable circuit 330-1 may be operatively coupled to a controller 302-1, which may be operatively coupled to at least one of wireless system interfaces 306-1 through 306-n. As illustrated a plurality of antennas may be provided for wireless system interfaces 306-1 through 306-n, some or all of which may share one or more antennas. Hence, in this example, antenna 502 is labeled as antenna T1 and antenna 504 is labeled as antenna Tm, to reflect that that m may or may not necessarily equal n.

Controller 302-1 may, for example, be adapted to specify that an SPS receiver operate in a specific mode based, at least in part, on at least one operative condition associated with at least one wireless system interface. In this example, controller 302-1 may be adapted to specify such a mode as illustrated by operatively affecting in some manner mode configurable circuit 330-1. For example, as illustrated in FIG. 5, controller 302-1 may operatively affect selector 518 and/or a LO frequency generator 522 based, at least in part, on at least one operative condition associated with at least one wireless system interface and the specified mode for the SPS receiver in which mode configurable circuit 330-1 is provided. Hence, selector 518 and/or a LO frequency generator 522 as affected by controller 302-1 may selectively specify a mode of operation as desired.

For example, selector 518 may select between a plurality of SPS signals received through a plurality of circuits beginning with one or more antennas. As illustrated a plurality of antennas may be provided for the SPS receiver, some or all of which may shared. In this example, antenna 506 is labeled as antenna G1 and antenna 508 is labeled as antenna Gy. Antenna 506 may be coupled to a band pass filter (BPF) 510 that may have its output coupled to a low noise amplifier (LNA) 512 which may have its output being selectable via selector 518. Similarly, antenna 508 may be coupled to a BPF 514 that may have its output coupled to LNA 516 which may have its output also being selectable via selector 518. The output that is selected via selector 518 may then be provided to a mixer 520 along with the output from LO frequency generator 522. The output of mixer 520 may be coupled to a low pass filter (LPF) 524 and its output may be sampled and provided to an analog to digital converter (ADC) 526. The output from ADC 526 may be coupled to additional circuitry and/or logic to provide further digital baseband processing 530.

Figure 6:
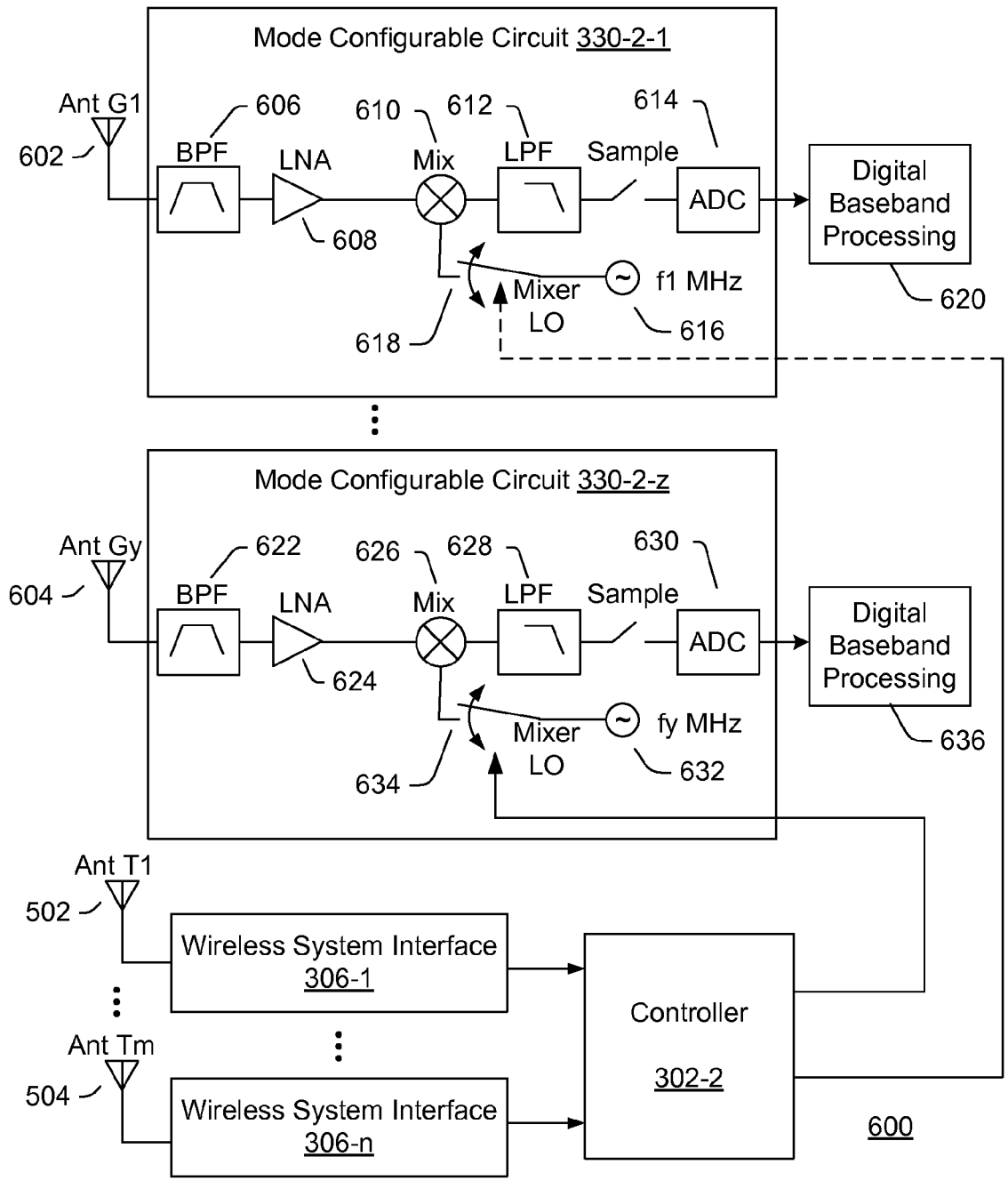
FIG. 6 is a block diagram illustrating certain features of an exemplary device having a multiple receive path mode configurable circuit that may, for example, be implemented in the device of FIG. 1.

FIG. 6 is a block diagram illustrating certain features of an exemplary device having a multiple receive path mode configurable circuits 330-2-1 through 330-2-z. Mode configurable circuits 330-2-1 through 330-2-z may be operatively coupled to a controller 302-2, which may be operatively coupled to at least one of wireless system interfaces 306-1 through 306-n.

Controller 302-2 may, for example, be adapted to specify that an SPS receiver operate in a specific mode based, at least in part, on at least one operative condition associated with at least one wireless system interface. In this example, controller 302-2 may be adapted to specify such a mode as illustrated by operatively affecting in some manner at least one of mode configurable circuits 330-2-1 through 330-2-z.

Thus, as illustrated in FIG. 6, controller 302-1 may, for example, operatively affect selector 618 to selectively apply the output of LO frequency generator 616 to mixer 610 of mode configurable circuit 330-2-1. For example, controller 302-1 may do so based, at least in part, on at least one operative condition associated with at least one wireless system interface. Such a controller may also do so based at least in part on the specified mode for the SPS receiver in which mode configurable circuit 330-2 is provided. Hence, selector 618 as affected by controller 302-2 may selectively specify a mode of operation as desired for mode configurable circuit 330-2-1.

Similarly, as further illustrated controller 302-1 may, for example, operatively affect selector 634 to selectively apply the output of LO frequency generator 632 to mixer 626 of mode configurable circuit 330-2-z. Here, controller 302-1 may do so based, at least in part, on at least one operative condition associated with at least one wireless system interface and the specified mode for the SPS receiver in which mode configurable circuit 330-2 is provided. Thus, selector 634 as affected by controller 302-2 may selectively specify a mode of operation as desired for mode configurable circuit 330-2-z.

With regard to exemplary mode configurable circuit 330-2-1, antenna 602 which is labeled as antenna G1 may be coupled to a BPF 606 that may have its output coupled to a LNA 608, which may have its output coupled to a mixer 610 along with or without the selectively applied output from LO frequency generator 616. The output of mixer 610 may be coupled to a LPF 612, and its output may be sampled and provided to an ADC 614. The output from ADC 614 may be coupled to additional circuitry and/or logic to provide further digital baseband processing 620.

With regard to exemplary mode configurable circuit 330-2-z, antenna 604 which is labeled as antenna Gy may be coupled to a BPF 622 that may have its output coupled to a LNA 624, which may have its output coupled to a mixer 626 along with or without the selectively applied output from LO frequency generator 632. The output of mixer 626 may be coupled to a LPF 628, and its output may be sampled and provided to an ADC 630. The output from ADC 630 may be coupled to additional circuitry and/or logic to provide further digital baseband processing 636. Digital baseband processing 636 may be the same or different than digital baseband processing 620.

In the examples of FIGS. 5 and 6, while shown using discrete components it is recognized that in other implementations multiband antennas, filters, LNAs, or the like, may also be used.

FIGS. 5 and 6 illustrate some example implementations that are not intended to limit other designs and/or claimed subject matter. For example, while shown as being in one block, in certain implementations BPF and/or LNA circuitry may or may not be integrated. Also, for example, in certain implementations, a mixer may or may not be shared (e.g., different receive paths may be combined at a mixer output). In certain example limitations there may not be a switch at the LNA (or mixer) outputs to select the active path. Instead, for example, an appropriate path may be selected by enabling (e.g., powering up) only one LO generator and/or an associated VCO buffer, etc. Here, for example, each mixer may have an LO generator attached to it, and the mixer outputs may be tied together, and a VCO may be buffered to each LO generator using separate buffers. Similarly, with regard to the example in FIG. 6, instead of using one of the switches (618, 634) to select an active path, one of the receiver chains may be powered up and the other(s) may be powered down.

The methodologies described herein may be implemented by various means depending upon the application. For example, these methodologies may be implemented in hardware, firmware, software, or a combination thereof. For a hardware implementation, all or part of device 102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may, for example, be implemented with modules (e.g., procedures, functions, and so on) that perform the functions described herein. Any machine or computer readable medium tangibly embodying instructions may be used in implementing the methodologies described herein. For example, software codes or instructions and other data may be stored in memory, for example memory 310, and executed by processing unit 308 or other like circuits within device 102.

As used herein the term "memory" refers to any type of long term, short term, volatile, nonvolatile, or other memory and is not to be limited to any particular type of memory or number of memories, or type of media upon which information may be stored.

In certain exemplary implementations, the functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. An apparatus comprising:
   at least one wireless system interface;
   at least one satellite positioning system (SPS) receiver adapted to selectively operate in at least a first mode and a second mode, wherein said SPS receiver is adapted to receive at least a first SPS signal if operating in said first mode and at least a second SPS signal if operating in said second mode; and
   at least one controller coupled to said wireless system interface and said SPS receiver and adapted to specify that said SPS receiver operate in one of said first mode or second modes based, at least in part, on at least one operative condition associated with said wireless system interface.

2. The apparatus as recited in claim 1 wherein said at least one controller is adapted to selectively initiate a transition in the operation of said SPS receiver between said first and said second modes based, at least in part, on said at least one operative condition associated with said wireless system interface.

3. The apparatus as recited in claim 1, wherein said at least one controller is adapted to identify said at least one operative condition associated with said wireless system interface.

4. The apparatus as recited in claim 1, wherein said at least one operative condition associated with said wireless system interface is dynamically established.

5. The apparatus as recited in claim 1, wherein said at least one operative condition associated with said wireless system interface is programmably established.

6. The apparatus as recited in claim 1, wherein said at least one operative condition associated with said wireless system interface comprises a frequency related operative condition.

7. The apparatus as recited in claim 1, wherein said at least one operative condition associated with said wireless system interface comprises a timing related operative condition.

8. The apparatus as recited in claim 1, wherein said at least one operative condition associated with said wireless system interface comprises a transmission related operative condition.

9. The apparatus as recited in claim 1, wherein said at least one operative condition associated with said wireless system interface comprises a reception related operative condition.

10. The apparatus as recited in claim 1, wherein said at least one controller is adapted to selectively initiate a change in the operation of said SPS receiver from said first mode to said second mode if said at least one operative condition associated with said wireless system interface is determined by said at least one controller to be: (i) operatively less compatible with said first mode and/or (ii) operatively more compatible with said second mode.

11. The apparatus as recited in claim 1, wherein said at least one wireless system interface is adapted for use in at least one wireless system selected from a group of wireless communication systems comprising a wireless wide area network (WWAN), a wireless local area network (WLAN), a wireless personal area network (WPAN), and a wireless metropolitan area network (WMAN).

12. The apparatus as recited in claim 1, wherein said at least one wireless system interface is adapted for use in at least one wireless system selected from a group of wireless broadcast systems comprising a MediaFLO system, a Digital TV system, a Digital Radio system, a Digital Video Broadcasting-Handheld (DVB-H) system, a Digital Multimedia Broadcasting (DMB) system, and an Integrated Services Digital Broadcasting-Terrestrial (ISDB-T) system.

13. The apparatus as recited in claim 1, wherein said at least one wireless system interface comprises at least one interface circuit selected from a group of interface circuits comprising a receiver, a transmitter, and a transceiver.

14. The apparatus as recited in claim 1, wherein said at least one SPS receiver is adaptable to receive at least one SPS signal selected from a group of SPS signals comprising a GPS signal, a Galileo signal, a Glonass signal, and a Compass signal.

15. The apparatus as recited in claim 1, wherein said at least one SPS receiver comprises a frequency-adaptable single receive path circuit.

16. The apparatus as recited in claim 1, wherein said first SPS signal is within a first frequency band and said second SPS signal is within a second frequency band.

17. The apparatus as recited in claim 1, wherein said first SPS signal is within a first channel of a frequency band and said second SPS signal is within a second channel of said frequency band.

18. The apparatus as recited in claim 1, wherein said first SPS signal is associated with at least one of a first Global Navigation Satellite System (GNSS), a first regional navigation system, and/or a first Satellite Based Augmentation System (SBAS), and said second SPS signal is associated with at least one of a second GNSS, a second regional navigation system, and/or a second SBAS.

19. The apparatus as recited in claim 1, wherein said at least one wireless system interface and said at least one SPS receiver are adapted to operate concurrently.

20. The apparatus as recited in claim 1, wherein said apparatus comprises a mobile device.

21. A method comprising:
providing a communication device having at least one wireless system interface and at least one satellite positioning system (SPS) receiver, wherein the SPS receiver is adapted to selectively operate in at least a first mode to receive at least a first SPS signal and in a second mode to receive at least a second SPS signal; and
selectively specifying that the SPS receiver operate in one of said first mode or second modes based, at least in part, on at least one operative condition associated with said wireless system interface.

22. The method as recited in claim 21, further comprising:
selectively changing the operation of said SPS receiver between said first and said second modes based, at least in part, on said at least one operative condition associated with said wireless system interface.

23. The method as recited in claim 21, further comprising:
identifying said at least one operative condition associated with said wireless system interface.

24. The method as recited in claim 21, wherein said at least one operative condition associated with said wireless system interface is dynamically identified.

25. The method as recited in claim 21, wherein said at least one operative condition associated with said wireless system interface is programmably identified.

26. The method as recited in claim 21, wherein said at least one operative condition associated with said wireless system interface comprises a frequency related operative condition.

27. The method as recited in claim 21, wherein said at least one operative condition associated with said wireless system interface comprises a timing related operative condition.

28. The method as recited in claim 21, wherein said at least one operative condition associated with said wireless system interface comprises a transmission related operative condition.

29. The method as recited in claim 21, wherein said at least one operative condition associated with said wireless system interface comprises a reception related operative condition.

30. The method as recited in claim 21, further comprising:
selectively changing the operation of said SPS receiver from said first mode to said second mode if said at least one operative condition associated with said wireless system interface is determined to be: (i) operatively less compatible with said first mode and/or (ii) operatively more compatible with said second mode.

31. The method as recited in claim 21, wherein said at least one wireless system interface is adapted for use in at least one wireless system selected from a group of wireless communication systems comprising a wireless wide area network (WWAN), a wireless local area network (WLAN), a wireless personal area network (WPAN), and a wireless metropolitan area network (WMAN).

32. The method as recited in claim 21, wherein said at least one wireless system interface is adapted for use in at least one wireless system selected from a group of wireless broadcast systems comprising a MediaFLO system, a Digital TV system, a Digital Radio system, a Digital Video Broadcasting-Handheld (DVB-H) system, a Digital Multimedia Broadcasting (DMB) system, and an Integrated Services Digital Broadcasting-Terrestrial (ISDB-T) system.

33. The method as recited in claim 21, wherein said at least one wireless system interface comprises at least one interface circuit selected from a group of interface circuits comprising a receiver, a transmitter, and a transceiver.

34. The method as recited in claim 21, wherein said at least one SPS receiver is adaptable to receive at least one SPS signal selected from a group of SPS signals comprising a GPS signal, a Galileo signal, a Glonass signal, and a Compass signal.

35. The method as recited in claim 21, wherein selectively changing the operation of said SPS receiver from said first mode to a second mode comprises adjusting a frequency-adaptable single receive path circuit.

36. The method as recited in claim 21, wherein said first SPS signal is within a first frequency band and said second SPS signal is within a second frequency band.

37. The method as recited in claim 21, wherein said first SPS signal is within a first channel of a frequency band and said second SPS signal is within a second channel of said frequency band.

38. The method as recited in claim 21, wherein said first SPS signal is associated with at least one of a first Global Navigation Satellite System (GNSS), a first regional navigation system, and/or a first Satellite Based Augmentation System (SBAS), and said second SPS signal is associated with at least one of a second GNSS, a second regional navigation system, and/or a second SBAS.

39. The method as recited in claim 21, further comprising:
concurrently operating said at least one wireless system interface and said at least one SPS receiver.

40. An apparatus comprising:
- means for communicating with at least one wireless system; and
- means for selectively operating a satellite positioning system (SPS) receiver in a first mode to receive at least a first SPS signal or in a second mode to receive at least a second SPS signal based, at least in part, on at least one operative condition associated with said means for communicating with at least one wireless system.

41. The apparatus as recited in claim 40, wherein said means for selectively operating a satellite positioning system (SPS) receiver in at least a first mode to receive said first SPS signal and in said second mode to receive a second SPS signal comprises means for selectively transitioning the operation of said SPS receiver between said first and said second modes based, at least in part, on at least one operative condition associated with said wireless system interface.

42. The apparatus as recited in claim 40, further comprising:
- means for adapting said at least one SPS receiver to operate in at least said first mode; and
- means for adapting said at least one SPS receiver to operate in at least said second mode.

43. The apparatus as recited in claim 40, further comprising:
- means for identifying said at least one operative condition associated with said wireless system interface.

44. The apparatus as recited in claim 40, wherein said first SPS signal is within a first frequency band and said second SPS signal is within a second frequency band.

45. The apparatus as recited in claim 40, wherein said first SPS signal is within a first channel of a frequency band and said second SPS signal is within a second channel of said frequency band.

46. The apparatus as recited in claim 40, wherein said first SPS signal is associated with at least one of a first Global Navigation Satellite System (GNSS), a first regional navigation system, and/or a first Satellite Based Augmentation System (SBAS), and said second SPS signal is associated with at least one of a second GNSS, a second regional navigation system, and/or a second SBAS.

47. A computer readable medium comprising computer implementable instructions stored thereon which if executed by at least one processing unit are adapted to enable said at least one processing unit to:
- selectively specify that at least one satellite positioning system (SPS) receiver in a communication device having also at least one wireless system interface, operate in one mode of operation selected from at least a first mode to receive at least a first SPS signal and a second mode to receive at least a second SPS signal based, at least in part, on at least one operative condition associated with said wireless system interface.

48. The computer readable medium as recited in claim 47, further comprising computer implementable instructions stored thereon which if executed by at least one processing unit are adapted to enable said at least one processing unit to:
- selectively change the operation of said SPS receiver between said first and said second modes based, at least in part, on said at least one operative condition associated with said wireless system interface.

49. The computer readable medium as recited in claim 47, further comprising computer implementable instructions stored thereon which if executed by at least one processing unit are adapted to enable said at least one processing unit to:
- identify said at least one operative condition associated with said wireless system interface.

50. The computer readable medium as recited in claim 47, wherein said first SPS signal is within a first frequency band and said second SPS signal is within a second frequency band.

51. The computer readable medium as recited in claim 47, wherein said first SPS signal is within a first channel of a frequency band and said second SPS signal is within a second channel of said frequency band.

52. The computer readable medium as recited in claim 47, wherein said first SPS signal is associated with at least one of a first Global Navigation Satellite System (GNSS), a first regional navigation system, and/or a first Satellite Based Augmentation System (SBAS), and said second SPS signal is associated with at least one of a second GNSS, a second regional navigation system, and/or a second SBAS.

* * * * *